Feb. 11, 1930.                S. B. WINN                 1,746,453
                        TWO-WHEEL TRAILER BRAKE
                        Filed March 13, 1926        3 Sheets-Sheet 1
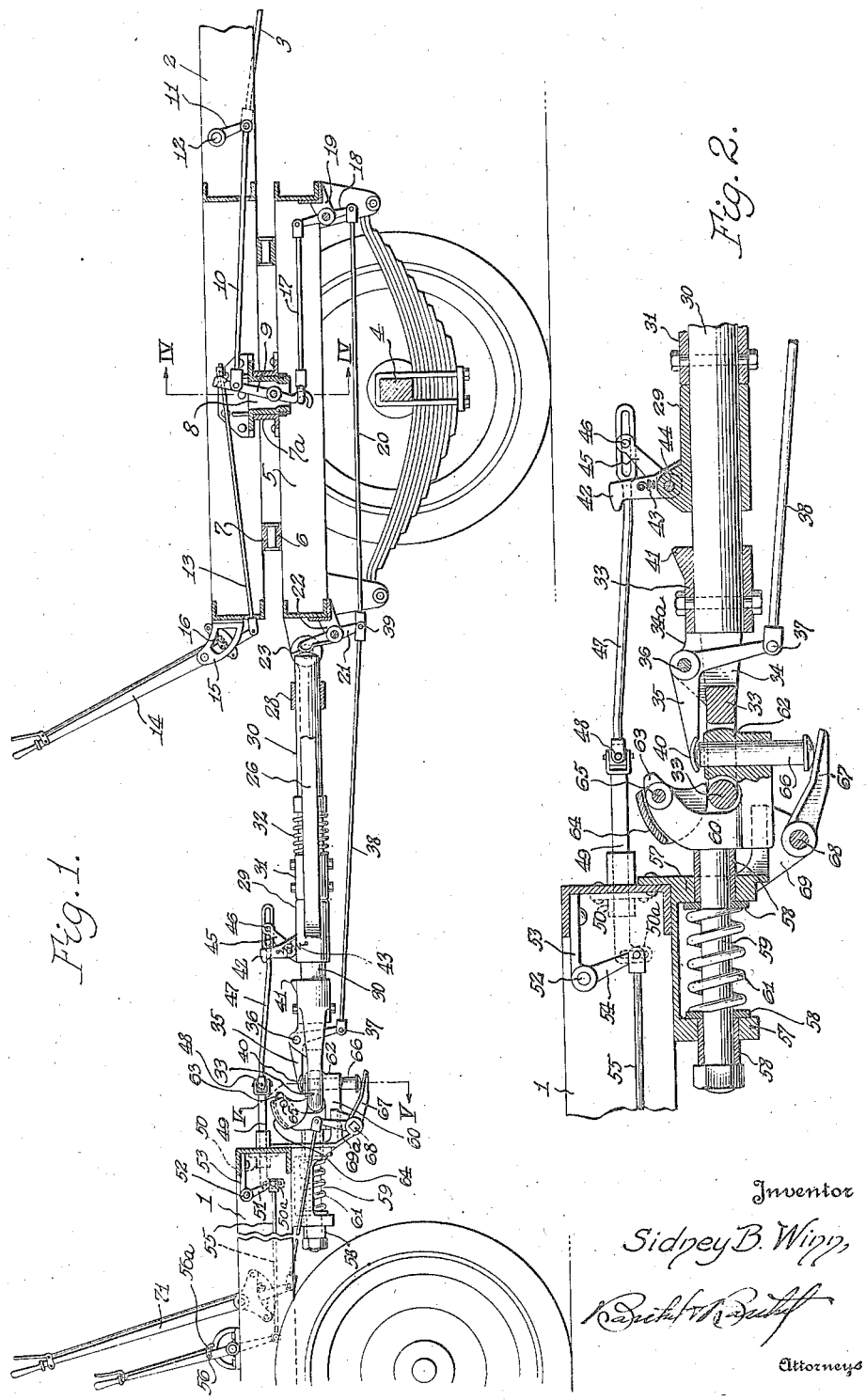
Inventor
Sidney B. Winn,
Attorneys

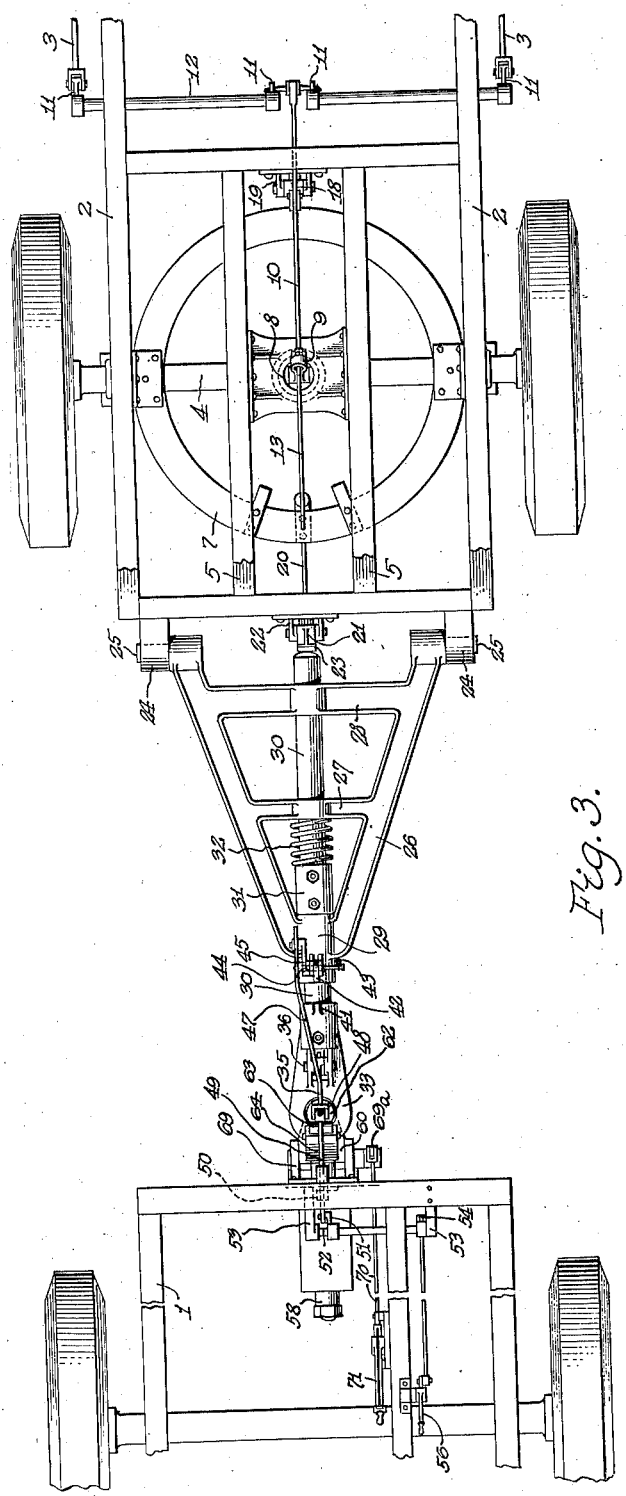

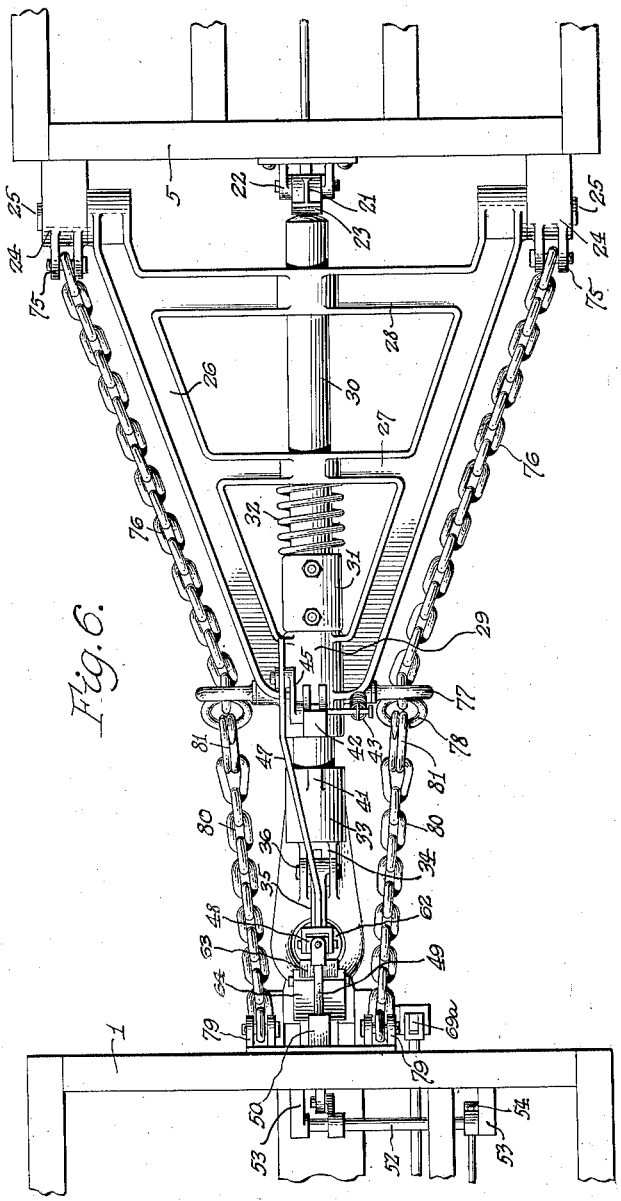
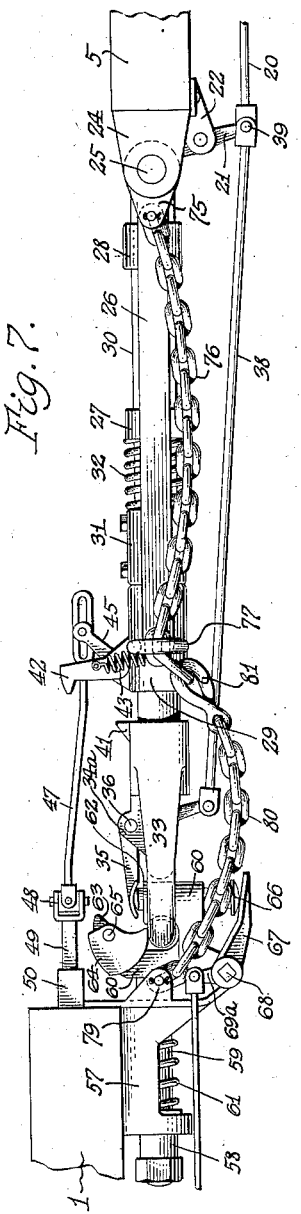

Patented Feb. 11, 1930

1,746,453

UNITED STATES PATENT OFFICE

SIDNEY B. WINN, OF LAPEER, MICHIGAN

TWO-WHEEL TRAILER BRAKE

Application filed March 13, 1926. Serial No. 94,403.

This invention relates to a tractor trailer combination which might be entitled, a "two wheel trailer brake" to distinguish it from a four-wheel trailer brake disclosed in my companion application filed under even date.

In a tractor trailer combination, my invention aims to provide a four-wheel trailer with the rear wheels provided with brakes controlled by a brake operating mechanism which extends forwardly to a tractor or towing vehicle coupled to the trailer. The tractor includes a draft appliance, a coupling, trailer brake operating mechanism and a coupling locking device.

The trailer or towed vehicle has a front axle assembly or truck with a fifth wheel action relative to the trailer chassis or body and the trailer is equipped with a brake mechanism that may be manually operated or controlled from the tractor or towing vehicle.

Coupling the tractor to the trailer is a tongue normally carried by the trailer and supporting part of the brake operating mechanism by which the trailer brakes may be controlled from the tractor. The tongue includes a draw bar operative by the trailer crowding towards the tractor to effect movement of a portion of the brake operating mechanism to apply the trailer brakes, and on the tongue is an anti-brake applying device which is brought into action to prevent the application of the trailer brakes when the tractor is to back the trailer, and a portion of a safety coupling device.

My invention will be hereinafter more fully described and then claimed and reference will now be had to the drawings, wherein Figure 1 is a longitudinal sectional view of a portion of the tractor trailer combination in accordance with this invention;

Fig. 2 is an enlarged longitudinal sectional view of a tractor and tongue coupler;

Fig. 3 is a plan of the tractor trailer combination shown in Fig. 1;

Fig. 4 is an enlarged cross sectional view of a portion of the trailer taken on the line IV—IV of Fig. 1, Fig. 5 is an enlarged cross sectional view taken on the line V—V of Fig. 1 showing the coupler, Fig. 6 is an enlarged plan of the towing tongue and safety coupling device, and Fig. 7 is a side elevation of the same.

In some of my prior patents, for instance Nos. 1,548,966; 1,548,967 or 1,548,968, all dated Aug. 11, 1925, there are tractor trailer combinations and in this application I deem it unnecessary to fully illustrate a complete tractor or a complete trailer. I only show a portion of a tractor chassis 1 and a trailer chassis 2 and it is to be understood that the rear end of the trailer has a rear axle assembly or rear truck provided with brakes that may be controlled by one or more rearwardly extending brake rods 3.

Considering the trailer equipment of this invention, there is a front axle assembly or truck 4 having a bolster or frame 5 provided with a fifth wheel member 6 and a concentric hollow or tubular bearing 7$^a$ for a hollow or tubular king pin 8 carried by the forward end of the trailer chassis 2. This end of the trailer chassis has a fifth wheel member 7 cooperating with the fifth wheel member 6 in providing a swivel or fifth wheel action connection between the trailer chassis and the front truck 4.

Pivotally mounted in the tubular king pin 8 is a rock arm 9 pivotally connected to a reach rod 10 extending rearwardly to the crank portion 11 of one or more rock shafts 12 to which are operatively connected the brake rods 3.

Operatively connected to the upper end of the arm 9 is a forwardly extending reach rod 13 connected to a hand lever 14 supported by a bracket 15 from the forward end of the trailer chassis, said hand lever having a locking device generally designated 16 by which the hand lever may be set in adjusted position. The hand lever constitutes a manual control for the trailer brakes and with the rear end of the reach rod 13 loosely articulated relative to the upper end of the arm 9, said arm may be rocked to apply the trailer brakes independent of the manual brake control. It will also be noted that irrespective of the position of the front truck 4 relative to the forward end of the trailer chassis that the brake mechanism is in an operatable condition.

Connected to the lower end of the pivoted brake arm 9 is a rearwardly extending rod 17 which is pivotally connected to the upper end of a double crank 18 pivotally supported by a bracket 19 from the rear part of the truck frame 5. The double crank 18 is pivotally connected to a forwardly extending rod 20 operatively coupled to another double crank 21 pivotally supported in a bracket 22 carried by the forward end of the truck frame 5. The upper end of this double crank has a configuration of a shoe or contact member 23 for a purpose that will hereinafter appear.

Extending forwardly from the truck frame 5 are side bearings 24 for the pivot pins or trunnions 25 of a coupling tongue 26 which is substantially triangular or A-shaped in plan, said tongue including cross members 27 and 28 and a guide sleeve or abutment 29. Slidable in the guide sleeve 29 and the cross members 27 and 28 is a draw bar 30 having its rear end engaging the shoe 23 of the double crank 21. On the draw bar 30, within the tongue 26 is a stop collar 31 adapted to engage the guide sleeve or abutment 29, and encircling the draw bar 30 between the stop collar 31 and the cross member 27 is a coiled expansion spring 32 adapted to hold the stop collar 31 normally against the guide sleeve or abutment 29 of the tongue 26. This coiled expansion spring 32 is weaker than a draft spring to be hereinafter considered in connection with the tractor.

On the forward or outer end of the draw bar 30 is an eye coupler head 33 provided with an opening 34 having flanked bearings 34$^a$ providing clearance for a bell crank 35 pivotally mounted on a pin 36 connecting the bearings 34$^a$. One arm of the bell crank 35 extends through the opening 34 and is pivotally connected, as at 37 to the forward end of a reach member or rod 38 extending rearwardly and operatively connected, as at 39, to the lower end of the double crank 21. This reach rod may be flexible. The other arm of the bell crank 35 extends over the eye coupler head 33 and terminates in a shoe 40.

The eye coupler head 33 has a shoulder 41 adapted to be engaged by an anti-brake applying latch 42 pivotally mounted on the guide sleeve 29 of the tongue 26, said latch being connected to the guide sleeve 29 by a coiled retractile spring 43 arranged so that its retractile force will keep the latch either in a closed or open position. By the use of spring 43 it is possible to shift latch 42 from one extreme to the other without requiring this duty to be entirely performed by rod 47, the latter moving the latch far enough to pass the dead center, whereupon the spring completes the movement. This permits of the use of the pin and slot connection 46 of sufficient lost motion effect to enable proper turning action without requiring an excessive length of movement of lever 56. The latch 42 is pivotally mounted on a rock shaft 44 and one end of the rock shaft has a crank 45 with a pin and slot connection 46 to the rear offset end of a forwardly extending rod 47. This rod is connected by a universal joint 48 to a link 49 extending through a guide 50, carried by the rear end of the tractor 1 and said link has a pin and slot connection 50$^a$ with a crank 51 of a rock shaft 52, journaled in bearings 53, carried by the rear end of the tractor 1. On the rock shaft 52 is another crank 54 operatively connected by a rod 55 to a latch operating lever 56 supported on the tractor. The operating lever 56 has a conventional form of locking mechanism 56$^a$ so that said lever may be secured to hold the latch operating mechanism so that the universal joint 48 will be above the coupler and in the axis of the pin 66. This will permit of the tractor turning relative to the trailer without interfering with the latch mechanism. When the lever 56 is pulled rearwardly the latch 42 is lowered and constitutes a member interposed between the eye coupler head 33 and the guide sleeve 29 of the tongue to prevent relative movement of the draw bar 30 and the tongue in the direction of decreasing the distance between tractor and trailer—relative movement in the opposite direction is not affected. While activity of the latch would prevent the trailer advancing upon the tractor (the tongue is held against advance relative to the coupler head), the main purpose of the latch 42 is to set the parts to permit backing of the trailer by the tractor without applying the brakes. Since the trailer is relatively stationary at the beginning of the backing movement, the presence of the latch prevents the draft bar and coupling from moving rearwardly relatively to the tongue, and hence there can be no relative movement of trailer and draft bar such as would cause lever 21 to be rendered active to set the brakes. The conditions are thus in contrast with those where the trailer attempts to overrun the tractor. The elements 41 to 56, inclusive, constitute means for establishing a rigid connection, at will, between the draw bar 30 and the tongue 26, and when the tractor is to be detached from the trailer, either end of the rod 47 may be disconnected.

On the tractor 1 is a rear end bearing 57 provided with movable bushings or followers 58 supporting a draft rod 59 which has its rear end provided with a substantially hook shaped coupler head 60 adapted to receive the eye coupler head 33. Encircling the draft rod 59 between the bushings or followers 58, is a coiled draft spring 61 and with the rear bushing or follower 58 interposed between this spring and the coupler head 60 said spring is adapted to resist a forward movement of the draft rod 59, yet afford a draft appliance for the coupler heads connecting the tractor to the trailer.

The hook shaped coupler head 60 has a tubular or hollow stud 62 and an overhanging horn or jaw 63. The eye coupler head 33 is adapted to be lifted on to the head 60 with the stud 62 extending into the eye of the head 33, so that the eye may laterally turn about the stud as is essential when the tractor is turning relative to the trailer; it being remembered that the tongue 26 is connected to the truck frame 5 to swing in a vertical plane, but is held against any lateral movement relative to the truck frame. To prevent vertical displacement of the eye coupler head 33 relative to the tractor coupler head a locking device is employed in the form of a cam member or a keeper 64 pivotally connected to the horn or jaw 63 by a pin 65, said keeper being positioned over the forward end of the coupler head 33 so that it cannot become accidentally displaced relative to the coupler head 60. The keeper 64 is limited in its closing movement by the horn or jaw 63 and may be manually swung upwardly to provide clearance for the eye coupler head 33 when removing the same from the coupler head 60.

Loosely mounted in the hollow or tubular stud 62 of the coupler head 60 is a brake pin 66 having its upper end under the shoe 40 of the bell crank 35 and its lower end normally resting on the inclined or beveled arm 67 of a rock shaft 68, journaled in brackets 69 which serve as a guide for the coupler head 60, said guide brackets maintaining the coupler head 60 normally vertical, as shown in Fig. 2. Mounted on the end of the rock shaft 68 is a crank 69ª operatively connected by a rod 70 to a brake lever 71 carried by the tractor 1, said brake lever being of that type that may be adjusted and secured in an adjusted position.

Under ordinary operating conditions the tractor is normally coupled to the trailer, but the coupler heads 33 and 60 permit of the tractor and trailer being disconnected after the rod 47 has been disconnected. When the tractor and trailer are separated they may be used as separate units and as pointed out in the beginning the trailer brakes may be manually controlled by the lever 14.

Assuming that the tractor is to start forward with the trailer, the draft appliance may be brought into action which may be understood by considering Fig. 2, and imagining that the front end bearing 57 moves away from the coupler head 60, in which case the draft spring 61 is compressed. During this movement, which permits of the trailer and its load being gradually picked up for movement with the tractor, the crank 67 remains in engagement with the lower end of the brake pin 66 and the pin and slot connection 46 does not shift the latch crank 45, because the movement of the draft appliance is limited to the extent of not destroying the connection between the rod 47 and the crank 45 or the brake pin 66, and the crank 67. After the trailer load has been picked up by the tractor the draft appliance assumes normal position, such as shown in Fig. 2, but the draft spring 61 may again be brought into action for another purpose, as will hereinafter appear.

I will now assume that it is desired to apply the brakes of a trailer. The brake lever 71 of a tractor is pulled rearwardly and by virtue of its rod connection 70 with the shaft 68 the crank 67 raises the brake pin 66 extending axially of the coupler heads 60 and 33. The bell crank 35 pulls forwardly on the rod or connection 38 and the rods 20 and 17 cause the brake arm 9 to be rocked, without materially shifting the rod 13, and the brake rods 10 and 3 are moved forwardly to apply the trailer brakes. It will be noted that when shifting the rods 38 and 20 that the double crank 21 has its shoe 23 moved rearwardly from the rear end of the draw bar 30, but when the brake lever 71 is shifted forwardly and the trailer brakes released the crank 21 assumes normal position with its shoe 23 in engagement with the rear end of the draw bar. This shifting of the trailer brake mechanism is ordinarily accomplished by springs associated with the brakes on the rear axle assembly of the trailer and I have deemed it unnecessary to illustrate this part of the trailer.

I will now assume that road and load conditions may cause the trailer to crowd or attempt to overrun the tractor. If this takes place it must be remembered that the draw bar 30 is substantially a rigid member coupled to the tractor and with the draw bar slidable in the tongue 26 or the tongue slidable on the draw-bar, the trailer and tongue may move forward towards the rear end of the draw bar, which is engaged by the shoe 23 of the double crank 21. This causes the double crank 21 to be rocked and the rod 20 shifted forward causing the brake arm 9 to be rocked and the trailer brakes applied; such rocking movement of lever 21 is due to the fact that the pivot of said lever is carried by the trailer. As before pointed out, the draw-bar is rigid and may be considered, in operation, as a part of the tractor—its rear end, therefore, represents the tractor during periods of overrunning by the trailer. Hence, when the trailer begins its movement to decrease the distance between it and the rear end of the draw-bar, the latter prevents the upper end of lever 21 from advancing while the pivot of the lever advances with the trailer, causing the lower end of the lever 21 to be active in drawing rod 20 and applying the brakes. If the connection 38 is flexible there is no actuation of the bell crank 35, but if it is a rigid connection the bell crank 35 will be actuated and its shoe 40 moved away from the brake pin 66 without effecting the same. During this crowding or overrunning action of the trailer the light duty spring 32 is necessarily compressed and with its resistance less than the draft spring 61 there may be that condition of the light duty spring 32 being completely compressed in which instance the draft appliance is brought into action to further cushion the crowding movement of the trailer. As the coupler head 60 is pushed towards the rear end bearing 57, the draft spring 61 is brought into action and it will be noted that the head 60 is free to move relative to the guide bracket 69 indirectly supporting the crank 67. This crank being beveled or tapered permits the lower end of the brake pin 66 to ride forwardly on the crank and be elevated to actuate the bell crank 35 and further apply the trailer brakes. This cooperation of the heavy duty spring 61 with the light duty spring 32 is accomplished by making the flexible or rigid connection 38 of precise length to accomplish the desired cooperation of the two springs. If the entire overrunning or crowding of the trailer were made dependent on one spring, it could readily happen that if it were of sufficient resistance to meet a sudden rut condition, it would be too stiff to meet ordinary running; if designed for light overrunning or crowding, it would be too weak to meet heavy rut conditions, so the cooperation of the light and heavy duty springs can be depended upon to meet any road conditions.

With the draw bar 30 slidable in a tongue 26, it is obvious that if the tractor attempted to back the trailer that the trailer brakes would be set, so to overcome this condition it is necessary for the driver of the tractor to pull the lever 56 rearwardly. By virtue of its rod connection 55 with the rock shaft 52 the rod 47 is pulled forwardly and eventually the slotted end of the rod picks up the crank 45 and shifts the crank a sufficient distance to bring the retractile force of the spring 43 into action which places the latch 42 in engagement with the shoulder 41. This latch being interposed between the eye coupler head 33 and the guide sleeve 29 of the tongue 26 establishes a rigid draw bar tongue connection for backing purposes, thus preventing the draw bar 30 from actuating the bell crank 21 and applying the trailer brakes.

I desire to direct attention to the fact that when the towing tongue is disconnected from the tractor that the brake operating mechanism is also disconnected, this being automatically accomplished, because the brake pin 66 is supported by the coupler of the tractor and forms part of the tractor equipment. Part of the brake operating mechanism for the trailer is carried by the tongue and when the tongue is connected to the tractor the brake operating mechanisms of the tractor and trailer are brought into operative relation. Furthermore, I have used a conventional form of universal joint 48 and prefer the type that will permit of the rod 47 and the link 49 being easily disconnected, when the trailer towing tongue is to be separated from the tractor. Obviously, various kinds of connections can be used between the rod 47 and the link 49 that will permit of the disconnection or connection being quickly made.

I have previously mentioned that the trailer brakes can be controlled by the trailer lever 14, particularly when the trailer is independent of the tractor and should anything happen to the brake mechanism which extends forwardly from the trailer truck 5 to the tractor the hand setting brakes may be depended on for controlling the trailer.

Reference will now be had to Figs. 6 and 7, showing a safety and auxiliary coupling in connection with the main coupling. The side bearings 24 are provided with shackles 75 for chains or flexible members 76 which extend forwardly along the sides of the towing tongue 26 and through eye members or supports 77, carried by the guide sleeve 29. The forward ends of the chains have large links 78 preventing slippage of the chain ends from the eye members.

The tractor bearing 57 is provided with shackles 79 and detachably connected to said shackles are the ends of chains or flexible members 80 extending rearwardly at the sides of the main coupling and attached to the the links 78 by hooks, links or any suitable fastener members 81.

Should anything happen to the main coupling that would allow the towing and towed vehicles to separate, the auxiliary coupling comes into action and prevents such separation. Any time the towing tongue is to be uncoupled, the chains 80 can be disconnected from the tractor bearing 57 or from the chains 76.

Obviously my invention is adapted for a train formation of vehicles wherein a towing vehicle is coupled to a towed vehicle and as such I desire to broadly claim it.

What I claim is:—

1. In a train formation, a towing vehicle having a coupler head, a brake equipped towed vehicle, a tongue carried by said towed vehicle and adapted to be held by the coupler head of said towing vehicle, a brake operating mechanism extending from said towing vehicle to said towed vehicle, a normally-inactive lever carried by the towed vehicle and operatively connected to the brake-operating mechanism to partake of the mechanism movements, and means carried by said tongue adapted to render said lever active to cause application of the brakes of the towed vehicle when the latter attempts to push the towing vehicle.

2. A train formation as called for in claim 1, further characterized by means on said tongue adapted to maintain the lever inactive when the towed vehicle is to be backed by the towing vehicle.

3. A train formation as called for in claim 1, wherein said means includes a draw bar carried by said tongue with the draw-bar and tongue having a slidable relative movement, said draw-bar constituting a connection for said tongue with the coupler head of said towing vehicle, the rear end of said draw-bar being adapted to co-operate with the normally-inactive lever to render the latter active in applying the brakes to the towed vehicle.

4. The combination of a towing vehicle, a brake equipped towed vehicle, said vehicles being connected for dirigible movement therebetween, a tongue connecting the towing and towed vehicles, a brake operating mechanism extending from said towing vehicle to the brakes of said towed vehicle, said mechanism including a member in the axis of such dirigible connections, and a draw bar forming part of said tongue and operative by said towed vehicle crowding towards said towing vehicle to effect movement of a portion of said brake operating mechanism independently of member movement to apply the brakes of the towed vehicle.

5. In a tractor trailer combination, a trailer, a front truck, a hollow fifth wheel pin connection between said trailer and truck, a brake mechanism for said trailer with a portion of said brake mechanism extending through said hollow pin connection and another portion extending to the forward end of the trailer for manual operation, a tractor, a tongue connecting said tractor to said trailer, brake operating mechanism supported by said tractor and tongue adapted for controlling said trailer brake mechanism, and means carried by said tongue adapted to actuate the trailer brake mechanism when said trailer attempts to push said tractor.

6. A tractor trailer combination as called for in claim 5, further characterized by coupler heads connecting said tractor and tongue with part of the brake operating mechanism of said tractor extending through said coupler heads.

7. A tractor trailer combination as called for in claim 5, wherein said means includes a draw bar slidably mounted in said tongue and engaging a portion of said trailer brake mechanism.

8. In a tractor trailer combination, a tractor, a brake equipped trailer having a dirigible fore-carriage, a tongue carried by said trailer fore-carriage, said tongue being pivoted on a horizontal axis, coupler heads connecting said tractor and tongue, and brake operating mechanism extending from said tractor to the brakes of said trailer, said brake mechanism having a portion extending through one coupler head and overlying the other coupler head.

9. A tractor trailer combination as called for in claim 8, wherein one of said coupler heads is hooked shaped with an automatic latch carried by the hook and the other coupler head of eye configuration to fit down on the hooked shaped coupler head and be retained therein by the automatic latch.

10. In a tractor trailer combination, a tractor, a brake equipped trailer having a dirigible fore-carriage, a hook shaped tractor coupler head, a trailer eye coupling head carried by said fore-carriage and adapted to fit down on said tractor coupler head, a brake pin constantly in said tractor coupler head, brake operating mechanism supported from said trailer and overlying said brake pin, and brake operating mechanism on said tractor extending under said brake pin and adapted for shifting said pin to actuate the trailer brake mechanism.

11. A tractor trailer combination as called for in claim 10, further characterized by means on the tractor coupler head swingable over the trailer coupler head to prevent displacement thereof.

12. In a tractor trailer combination wherein a tractor is adapted to move a trailer, and wherein the trailer has a swiveled front truck;—tractor towing means for the trailer, said means comprising a tongue carried by the trailer and coupled to the tractor, a brake operating mechanism carried by said trailer and tongue and operatable from said tractor, means carried by said tongue operatively related to said brake operating mechanism adapted to effect actuation of said brake mechanism when said trailer attempts to overrun said tractor, and a draft appliance on said tractor brought into action by an excessive overrunning action of said trailer relative to said tractor to effect further actuation of the trailer brake operating mechanism.

13. A tractor trailer combination as called for in claim 12, wherein said means includes a spring cushioned draw bar directly coupled to said tractor and adapted to cause actuation of the trailer brake operating mechanism when the trailer overruns the tractor.

14. A tractor trailer combination as called for in claim 12, further characterized by means carried by said tongue and operative from said tractor to render said means ineffective for actuating the trailer brake mechanism when the tractor backs the trailer.

15. In a tractor trailer combination wherein a tractor is adapted to move a trailer, and wherein the trailer has a swiveled front truck;—tractor towing means for the trailer, said means comprising a tongue carried by the trailer, coupler heads connecting said tongue to said tractor, a brake operating mechanism for said trailer extending forward to the tractor with a portion of the mechanism extending through the swivel connection of said trailer with its truck and another portion extending through the coupler heads, means carried by said tongue operatively related to said brake operating mechanism adapted to effect actuation of said mechanism when said trailer attempts to overrun said tractor, and means carried by said tongue operative from said tractor to render said means ineffective for actuating the trailer brake mechanism when the tractor backs the trailer.

16. In a tractor trailer combination wherein a tractor is adapted to move a trailer and wherein the trailer has a swiveled front truck;—tractor towing means for the trailer, said means comprising a tongue carried by the trailer and adapted to be coupled to the tractor, a brake operating mechanism for the trailer extending forward to the tractor with a portion of the mechanism extending through the swivel connection of said trailer with its truck, a draw bar carried by said tongue operatively related to said brake operating mechanism to effect actuation of said mechanism when the trailer attempts to overrun the tractor, a latch carried by said tongue and operatable from the tractor to render said means ineffective for actuation of the trailer brake mechanism when the tractor backs the trailer, and hand operated means on the trailer to effect actuation of the brake operating mechanism independent of said draw bar.

17. In a tractor trailer combination, a trailer having a front truck, a tubular king pin connection between the trailer and its truck, a brake operating mechanism for the trailer including a rockable arm in the tubular king pin connection of the trailer and its truck, a towing tongue carried by the truck of said trailer and adapted to be coupled to a tractor, and means carried by said tongue brought into operation by an overrunning action of said trailer relative to the tractor adapted to actuate the trailer brake operating mechanism to retard the overrunning action of said trailer.

18. A tractor trailer combination as called for in claim 17, and means on said tongue adapted to render the last mentioned means ineffective for actuation of the trailer brake mechanism when the tractor backs the trailer.

19. In a train formation, a towed vehicle having a brake mechanism and having a dirigible fore-carriage, a towing tongue for said towed vehicle and carried by said fore-carriage, a towing vehicle, a coupler connecting said towing tongue to said towing vehicle, a towed vehicle brake controlling mechanism on said towing vehicle operably connected to the brake mechanism of said towed vehicle at said coupler and including a member extending in the axis of the coupler, said controlling mechanism being separable from the brake mechanism of said towed vehicle simultaneously with the separation of said towing vehicle and towing tongue at said coupler with the member remaining with the towing vehicle.

20. A train formation as called for in claim 19, wherein said towed vehicle brake controlling mechanism includes an anti-brake applying mechanism.

21. In a train formation, a towed vehicle, a towing tongue for said vehicle, a brake mechanism for said towed vehicle extending to the forward end of said towing tongue, a towing vehicle, a coupler carried by said towing vehicle for the forward end of said towing tongue, a towed vehicle brake controlling mechanism carried by said towing vehicle and brought into operation relative to the brake mechanism of the towed vehicle when the towing tongue is connected to the towing vehicle, said towed vehicle brake mechanism being automatically operable by the towed vehicle attempting to overrun the towing vehicle, and means carried by the towing vehicle extending on to the towing tongue adapted to prevent automatic actuation of the brakes of the towed vehicle when the towing vehicle backs the towed vehicle, said latter means including a spring-supported latch structure with the spring adapted to maintain the latch in its active and inactive positions.

22. A train formation as called for in claim 21, wherein the last mentioned means includes separable parts adapted to be disconnected when the towing tongue is uncoupled from the towing vehicle the latch spring being permanently carried by the tongue.

23. In a train formation wherein a towing vehicle is coupled to a towed vehicle, and wherein a truck supports the forward end of said towed vehicle;—a hollow swivel member connecting said truck to said towed vehicle, a brake mechanism for said towed vehicle, an arm pivoted in said hollow swivel member adapted for operating said brake mechanism, and means operatable from the towing vehicle for moving said arm for brake controlling purposes.

24. A train formation as called for in claim 23 and a hand brake mechanism on said towed vehicle for moving said arm for brake controlling purposes independent of said towing vehicle.

25. In a train formation wherein a towing vehicle is coupled to a towed vehicle, and wherein a truck supports the forward end of said towed vehicle;—a hollow swivel member connecting said truck to said towed vehicle, a brake mechanism for the rear end of said towed vehicle extending forwardly and through said hollow swivel member to the forward end of said truck, means for coupling the truck to the towing vehicle, and means operatable from the towing vehicle and extending through the coupling means for controlling said brake mechanism.

26. A train formation as called for in claim 25 and a towing device carrying a portion of the coupling means, said towing device including automatic means for operating said brake mechanism when the towed vehicle attempts to crowd the towing vehicle.

27. In a train formation wherein a towing vehicle is coupled to a towed vehicle, and wherein a truck supports the forward end of said towed vehicle:—a hollow swivel member connecting said truck to said towed vehicle, a brake mechanism for said towed vehicle, and an arm pivoted in said hollow swivel member adapted for operating said brake mechanism.

In testimony whereof I affix my signature.

SIDNEY B. WINN.